Patented Jan. 26, 1937

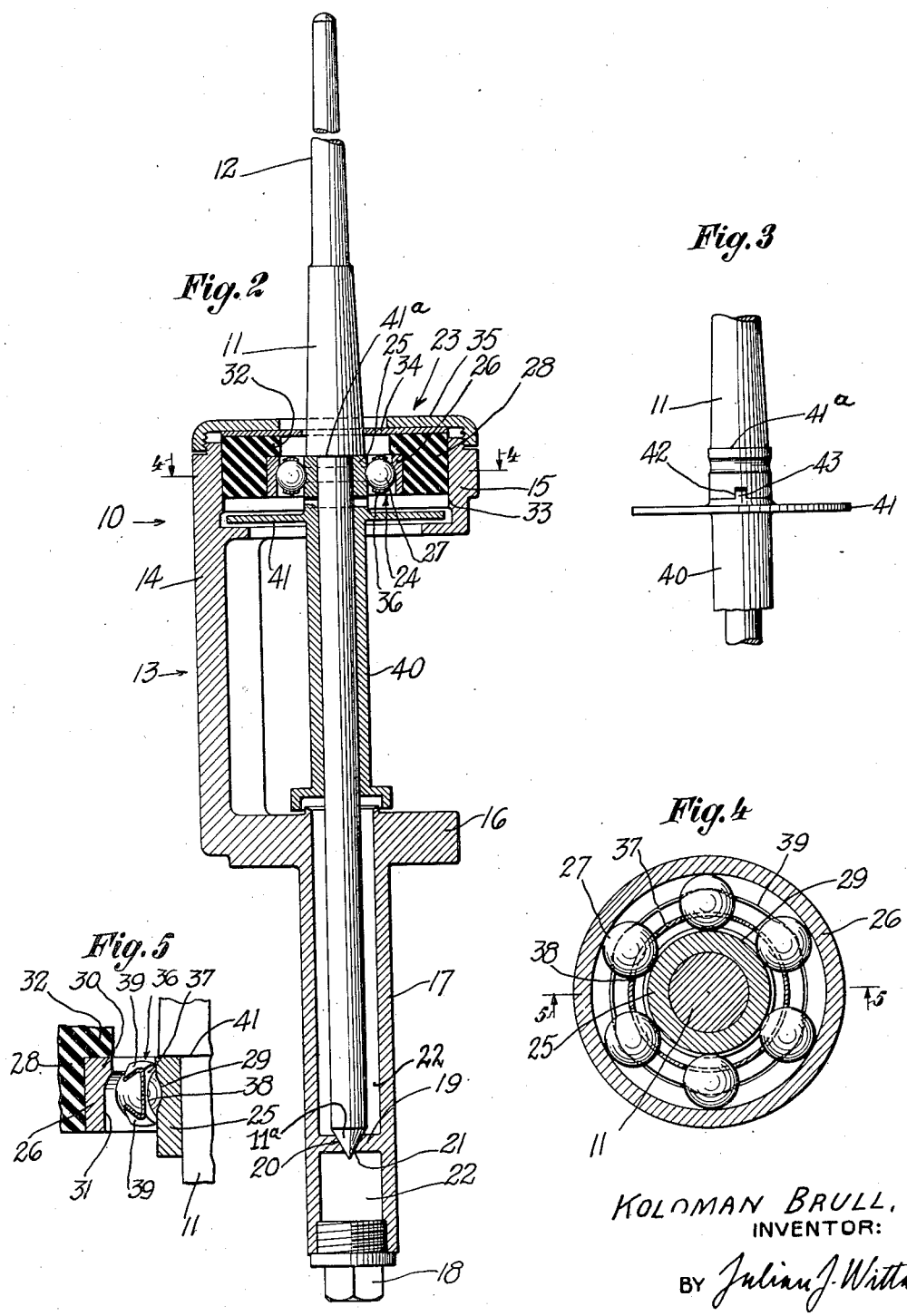

2,068,652

UNITED STATES PATENT OFFICE 2,068,652

HIGH SPEED SPINDLE AND BEARING MEANS FOR THE SAME

Koloman Brüll, New York, N. Y.

Application June 11, 1934, Serial No. 730,019
In Italy April 2, 1926

17 Claims. (Cl. 308—228)

This application is a continuation in part of my copending application Serial No. 174,498, filed March 11th, 1927 for Ball and roller bearings.

As has been pointed out in my said copending application: My invention relates to improvements in ball or roller bearings acting as shoulder bearings and more particularly to those for supporting the spindles of spinning, twisting and winding machines. The usual type of shoulder bearing for the spindles of said machines and the like reveals many disadvantages appearing in extremely sensitive forms, for example, breakage in the threads, flaws in the structure of the tissue and the like. Great difficulties have been experienced in overcoming these disadvantages, since the spindle, being of relatively large sizes, tends as a result of its construction to vibrate in an excessive manner, it being impossible to counterbalance vibrations of this kind in the bearings hitherto employed.

According to the present invention said disadvantages are avoided by mounting a ball bearing, preferably a shoulder bearing, above the whorl on the spindle, the outer ring of said bearing being embedded within an elastic or resilient member, preferably of rubber or the like, and which is provided with means for engaging the said bearing so as to hold the latter against axial displacement. By this means a suitable support of the spindle on the one hand and the elasticity or resiliency required for the high speed of revolutions on the other hand is ensured, i. e., in any direction.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Fig. 2 is a vertical section of a practical embodiment of my invention.

Fig. 3 is an external fragmentary view of a portion of the device shown in Fig. 2.

Fig. 4 is a horizontal sectional fragmentary view taken on line 4—4 of Fig. 2.

Fig. 5 is a fragmentary sectional view taken substantially on line 5—5 of Fig. 4.

Figure 1:
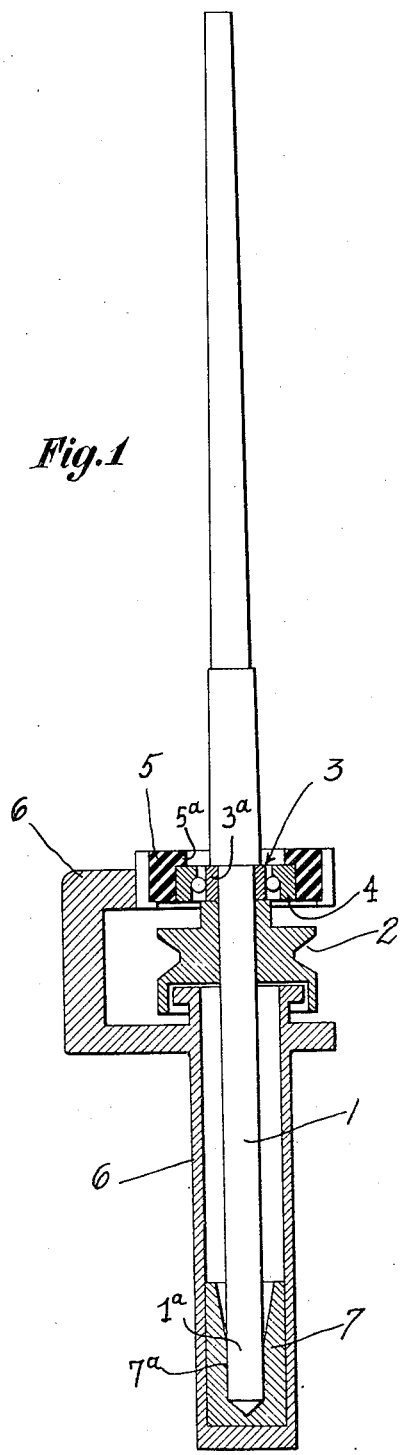
Fig. 1 is a more or less diagrammatical, sectional view of my device illustrating the principle of my invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

In Fig. 1, 1 designates the spindle and 2 the whorl. Above the whorl a ball bearing 3, preferably acting as shoulder bearing or so called bolster ball bearing is provided for supporting the spindle. The outer ring or race 4 of said bearing is embedded or otherwise fixed within an elastic ring or resilient member for mounting 5, preferably made of rubber, felt, cork, or a similar elastic material. Said ring, which is capable of being removed in an upward direction from the ball bearing, or the spindle respectively, together with the outer ball race 4 of the bearing is forced during the mounting of the spindle into the upper member of the spindle casing 6 or is otherwise fixed therein. In this manner a suitable support on the one hand and the necessary elasticity, acting in the direction of the axis of rotation of said spindle, and also in directions radial to said axis, on the other hand, is ensured, this elasticity being particularly necessary in view of the high speed of revolution of the spindle, when using ball or roller bearings. A step bearing 7 may be employed for supporting the lower end of the spindle, the same preferably having a conical termination and being supported substantially on the apex thereof so as to permit a free rocking, swinging, or swaying of the spindle around said point.

The upper bearing 3 may have a projection or flange 5a on its resilient member 5 for engaging the outer race 4, as shown, and so yieldingly counteracting its axial movement, while its inner race 3a may be fixed to the spindle 1, both against circumferential and axial movement in relation thereto.

It is to be understood that Fig. 1 is a diagrammatical showing only and that, for instance, the lower or step bearing 7 is shown with a sleeve-like portion 7a encircling the lower termination 1a of the spindle to a comparatively long distance upwardly, that is, being shown in an exaggerated manner, and that the close engagement of the bearing 7 with said spindle portion 1a and the cone thereof, shown in Fig. 1, also is to be understood as meaning the normal fitting of the parts which in the usual manufacturing always leaves some yielding play between the parts, and that, also, a film of lubricant is to be understood between said parts permitting a small play between them.

The oscillations and vibrations of the spindle are mainly caused by the centrifugal forces on account of the uneven distribution of the rotating masses in the spindle and its spool or bobbin, and by the constant changing of the center of gravity thereof.

It also will be perceived that according to this invention, a belt or the like is desirably used to rotate the whorl 2 and hence the spindle 1, although other means may be likewise used, such as a motor direct connected to the spindle. The belt or the like connection offers the advantages of a simple drive which permits the spindle to be rotated at extraordinarily high speeds, and one belt may be employed for a large number of spindles. As the belt exerts a lateral stress on the spindle, further radial oscillations thereof are caused, and vertical impulses are also imparted to the spindle on this account too. These different oscillations and impulses are adapted to be counteracted by the resilient mounting 5.

The whorl is preferably located in relative proximity to the mounting 5, and remotely from the relatively non-yielding bearing 7. It also is desirable to position the whorl intermediate of the mounting 5 and bearing 7 so that some degree of the stabilizing influence of the bearing 7 be utilized to take up the lateral impulses transmitted to the whorl, and for other practical advantages, like lower constructional height, lowering the center of gravity of the rotating masses, etc., well understood by those versed in this art.

All of these various considerations, requirements and desirable advantages are also answered and made attainable by my invention.

Since the spindle 1 is of substantially rigid construction, and necessarily acts as such at the extremely high rotational speeds employed, it will be seen that the spindle must be capable of radially angular motion relative to the bearing 7 if the latter be considered as rigid and fixed and hence independent of the bearing 3. The angular motion referred to is naturally extremely small in a well balanced and oscillation damped spindle; hence any slight clearance between the spindle and bearing 7, such, for example, as may suffice for lubrication of said bearing is ample to permit said angular motion to occur. By the same token, it may be said that the spindle possesses an angularly yielding coaction with the bearing 7, within the meaning of this invention and sufficient for the purposes thereof. More specifically, the resilient or yielding mounting 5 tends to overcome upward axial movements of the spindle and hence maintains the latter in uniform relation with the bearing 7. However, when the spindle oscillates laterally, the bearing 3, or at least the inner race thereof being maintained along a plane at right angles to the spindle axis, tends to influence certain balls of the bearing upward, the resulting upward movement of the corresponding part of the outer race being resisted by the adjacent part of the ring 5, so that in this way oscillations are restricted and wholly or partially damped. By exerting a downward force on the spindle, the ring 5 tends to actuate the spindle into accurate alinement with the bearing 7, and in this sense the latter through the agency of the means 5 serves as a yielding damping means. Moreover, even independently of the ring 5, the bearing 7 because of the small clearance with the spindle, tends to yieldingly centralize the same, and especially so, if the effect of any ordinary lubricant between the bearing 7 and the spindle be considered.

By the term yielding as herein used is meant any means whether solid or liquid, as applied to the oscillation damping means for the upper bearing; the term yielding may be used in a similar sense with respect to the lower bearing, although, in connection with the latter, it may signify merely the tendency toward alinement by reason of the fact that correspondingly shaped relatively rotating elements naturally tend to assume symmetrical relationships: this may apply to the conoidal portion of the lower bearing, to the sleeve part thereof, or to both. It will be seen that while the weight of the spindle may afford sufficient force to counteract upward tendencies of the spindle, yet the weight may be supplemented by the ring. 5. If the weight be sufficient in itself, then the member 5 may be regarded merely as affording leeway for movements of the bearing 3, while tending to return the bearing, or to support the same in a suitable position.

I now refer to Figs. 2 to 5 in which a practical embodiment of my invention is shown. The spindle device 10 may include a high speed vertical spindle 11 adapted for use in different kinds of machines and for different purposes, but of especial advantage as a twisting spindle for appropriate machines and purposes. The upper portion 12 of the spindle may carry a suitable spool or bobbin (not shown), while the lower portion thereof is mounted in the aforementioned manner on suitable means adapted to damp or check the oscillations of the spindle. The mounting may include, for example, a frame 13 having a yoke section 14 provided with upper and lower arms 15 and 16 respectively. The lower arm may have a downwardly extending tube 17 whose lower end is closed by a screw plug 18. Above the latter in the tube 17 is provided an appropriate element 19 having a step or conoidal bearing 20, the latter having an opening 21 for the apex of the spindle communicating with the lubricant chamber 22. The spindle 11 may have a conoidal lower end or step 11a of suitable shape, similar to the bearing 20, whereby the spindle is movably supported so as to extend through the tube 17 in spaced relation to the wall thereof, and through the upper and lower arms 15, 16 of the frame. The arrangement is such that the spindle has a substantially fixed pivotal engagement or yieldable angular or radial coaction with the bearing 20 in course of oscillation of the spindle. To allow for such oscillation, and thereby to reduce wear on the bearings, and at the same time to damp the oscillations, the upper mounting structure 23 will now be described.

The bearing structure 23 may include a ball bearing 24 comprising an inner race 25, an outer race 26, and balls 27 therebetween, and said bearing 24 being yieldably mounted in a resilient or yielding element 28, as shown. The inner race 25 may have an annular groove 29 for the balls, while the outer race may have at its upper part an annular shoulder 30 normally to overlap the balls and at its upper part may be of a diameter equal to the equatorial diameter of the ring of the balls. Said outer race may be suitably fixed to the member 28 by being tightly fitted thereinto, vulcanized thereto, or otherwise secured to it. Preferably, the said member may have some means, such as a projection or flange 32 to overlap the outer race. The arm 15 is formed with an opening 33 constituting a housing in which the ring 28 is tightly frictionally fitted. A felt washer 34 may overlie said ring 28 to avoid entrance of dust into the bearing, and a cap 35 may be screwed to said arm 15 to hold the washer and to afford a backing for the ring.

In order to maintain the balls in place, a cage 36 may be employed. The same may include an annular inner wall 37 having openings 38 for the balls, of lesser diameter than the latter, and having duplicate upper and lower annular flanges 39 squeezed together between the balls to retain the same in suitably angularly spaced relation to each other. It will be noted that the edges of the flanges 39 are amply spaced from the inner and outer races. To engage the balls and cage with the inner race, the latter is applied to the inner race with a resilient snap action.

Between the arms of the frame, and intermediate of the upper and lower bearings, the spindle 11 may have a whorl portion. Desirably the latter may consist of a sleeve 40 of small diameter press fitted on the spindle. At its upper end, said sleeve may have a disc 41 within the chamber 33 and tending to close the latter.

In order to mount the special steel inner race 25 on the spindle without strain, the said race may be seated against an annular shoulder 41a of the spindle and may be slidably locked with the whorl or other adjacent part against rotation on the spindle. For example, the race may have slots or cut outs 42 adapted to receive lugs 43 of the whorl. In this manner the race 25 may be fixedly mounted although applied with an ordinary fit on the spindle.

The manner of operation of the device will now be briefly described. The spindle is adapted to be driven at speeds up to 20,000 revolutions per minute, or possibly even more, and this can be accomplished in any standard machine merely by reducing the size of the whorl, which can be readily effected through my invention. In general, the mode of damping oscillations is the same as described for Fig. 1, and the same terminology applies. As a result of securing the outer race 26 completely in or to the rubber ring 28 as there and here mentioned, a substantially one piece construction results without any possbility of creeping and of generation of frictional heat and without lagging in overcoming oscillations of the spindle. Further, by keeping the inner space of the tube 17 around the spindle 11 free, the necessary quantity of lubricant can be contained therein and the resistance of the lubricant against the spindle rotation reduced. Further, it is possible for elements of the upper bearing 24 to tiltably move relatively to each other as about a point in the spindle axis. For example, when the spindle takes an oblique position and the balls on one side move downwardly in relation to the outer race, the balls on the other side will press the shoulder of the outer race upwardly, being resiliently opposed by the rubber ring. The balls will remain in a plane perpendicular to the spindle axis, while the outer race remains substantially horizontal. In the general operation of the device it suffices that the arrangement shall be such that the lower bearing shall have much less capacity for yielding adjustment of the spindle than the upper bearing. I have, however, found that the simplest construction and best results are obtained by making the lower bearing itself fixed, and allowing for slight angular motion and pivotal self centering tendency of the spindle therein.

I claim:

1. In a spindle, an upper bearing therefor at a fixed point along the spindle and lying in a plane at right angles to the spindle, means mounting said bearing for yieldably counteracting radial and upwardly axial motions of the spindle, means including a lower bearing for supporting the spindle and maintaining centralized the lower portion of the spindle, the lower bearing being radially relatively non-yieldably mounted, and means for rotating the spindle, as set forth.

2. A high speed twisting spindle, including a casing, a vertical spindle, a lower bearing being rigid in relation to the casing for centralizing an adjacent point of the spindle axis with the spindle having the capacity for describing radially angular oscillatory motions, an upper bearing for the spindle, and a yielding member united with an element of said upper bearing, said member having the capacity for immediately damping radial and upward oscillations of the spindle, and means to rotate said spindle, as set forth.

3. A high speed twisting spindle for spinning machines and the like, including a vertical spindle, a step bearing supporting the spindle at the lower end thereof, a ball bearing for the spindle remote from the step bearing, and a resilient ring means closely encircling said bearing and mounting the same, said ring means being mounted at a constantly fixed distance from the step bearing and being adapted to yieldingly and immediately counteract radially and upwardly axial forces acting on the spindle, said spindle being allowed to describe radial and upwardly axial movements.

4. In a bearing construction for high speed vertical spindles, an anti-friction bearing comprising an inner and an outer race and rolling anti-friction elements therebetween encircling said spindle, said inner race being secured on said spindle and said outer race being upwardly movable but prevented from moving downwardly, a stationarily secured element of resilient material closely encircling said outer race, and a resilient inward projection on said element engaging said outer race.

5. In a high speed twisting spindle, a supporting bearing means for the lower end of the spindle adapted to prevent radial and downwardly axial movement of said lower end; an upper bearing means for said spindle permitting, but yieldingly counteracting, axial and radial movements thereof, said spindle being adapted to describe a single cone around its lower end when rotating and oscillating.

6. In a high speed twisting spindle, a supporting bearing means for the lower end of the spindle adapted to prevent radial and downwardly axial movement of said lower end; an upper bearing means for said spindle permitting, but yieldingly counteracting, axial and radial movements thereof, said upper bearing including an inner race, an outer race, and anti-friction elements therebetween, said spindle being adapted to describe a single cone around its lower end when rotating and oscillating, the only parts directly participating in the movement of said spindle being the spindle itself, said inner race and said anti-friction elements.

7. For a high speed spindle supported at its lower end by a step bearing, a yielding collar bearing encircling said spindle at a distance above said lower end and having an inner race, an outer race and anti-friction elements, like balls, between the two races and a resilient ring, said ring encircling said outer race and being adapted to yieldingly counteract both, radial and upwardly axial, forces acting on said spindle.

8. In a high speed spindle having a spindle proper and means for rotating the same; a lower bearing for said spindle centralizing a part thereof by preventing a downward or sideways movement of said part but permitting an oscillatory angular movement of the spindle around said part; a second antifriction bearing for said spindle at a distance above said first bearing having an outer race movable in an upward direction but prevented from moving downwardly, and a resilient member closely engaging said outer race and yieldingly counteracting radial and upwardly axial forces on said spindle.

9. A bearing for the top portion of a spindle for spinning machines the foot end of which spindle is journaled in a step bearing, comprising in combination a housing, a ring of rubber in said housing, an inwardly projecting flange on the inner side at the top end of said rubber ring, and a ball bearing in said rubber ring including an inner race secured on said spindle, and an outer race engaging under said flange of said rubber ring.

10. In a bearing construction, as set forth in claim 9, said resilient ring and flange being one integral solid piece of rubber.

11. For a high speed spindle supported at its lower end by a step bearing, a yielding collar bearing encircling said spindle at a distance above said lower end and having an inner race, an outer race and anti-friction elements, like balls, between the two races; a resilient ring, said ring directly encircling said outer race and having a resilient inward flange thereon engaging the upper end of said outer race, said ring and its flange being adapted to yieldingly counteract both, radial and upwardly axial, forces acting on said spindle where the same is journalled in said collar bearing.

12. In a bearing for high speed spindles, as set forth in claim 11, said resilient ring and its flanges being made of one integral piece of material and being adapted to also counteract all other forces on said spindle having directions between said radial and said upwardly axial directions.

13. In a bearing for high speed spindles, as set forth in claim 11, said spindle being free and not journalled or supported in any other places but at the lower end thereof and at said yielding collar bearing.

14. In a bearing for high speed spindles, as set forth in claim 11, said outer race having an inward flange at its upper end restraining said balls, and said inner race being secured on said spindle.

15. In a high speed twisting spindle, a supporting bearing means for the lower end of the spindle adapted to prevent radial and downwardly axial movement of said lower end; an upper bearing means for said spindle permitting, but yieldingly counteracting, axial and radial movements thereof, said spindle being adapted to describe a single cone around its lower end when rotating and oscillating, said upper bearing having an inner and an outer race and anti-friction elements therebetween, said outer race remaining substantially horizontal while the spindle describes said cone.

16. In a spindle, an upper bearing therefor at a fixed point along the spindle and lying in a plane at right angles to the spindle, means mounting said bearing for yieldably counteracting radial and upwardly axial motions of the spindle, means including a lower bearing for supporting the spindle and maintaining centralized the lower portion of the spindle, the lower bearing being radially relatively non-yieldably mounted, and means for rotating the spindle, as set forth, the means for maintaining the lower portion of the spindle centralized including a part of a conical lower tip of the spindle engaging a corresponding part in a conical recess in the lower bearing while the tip of the spindle cone is left free.

17. In a high speed spindle having a spindle proper and means for rotating the same; a lower bearing for said spindle centralizing a part thereof by preventing a downward or sideways movement of said part but permitting an oscillatory angular movement of the spindle around said part; a second antifriction bearing for said spindle at a distance above said first bearing having an outer race movable in an upward direction but prevented from moving downwardly, and a resilient member closely engaging said outer race and yieldingly counteracting radial and upwardly axial forces on said spindle, and being adapted to also counteract all other forces on said spindle having directions between said radial and said upwardly axial directions.

KOLOMAN BRÜLL.